Feb. 12, 1924.
E. EGGIMANN
AUTOMOBILE VENTILATOR
Filed Dec. 12, 1922
1,483,290
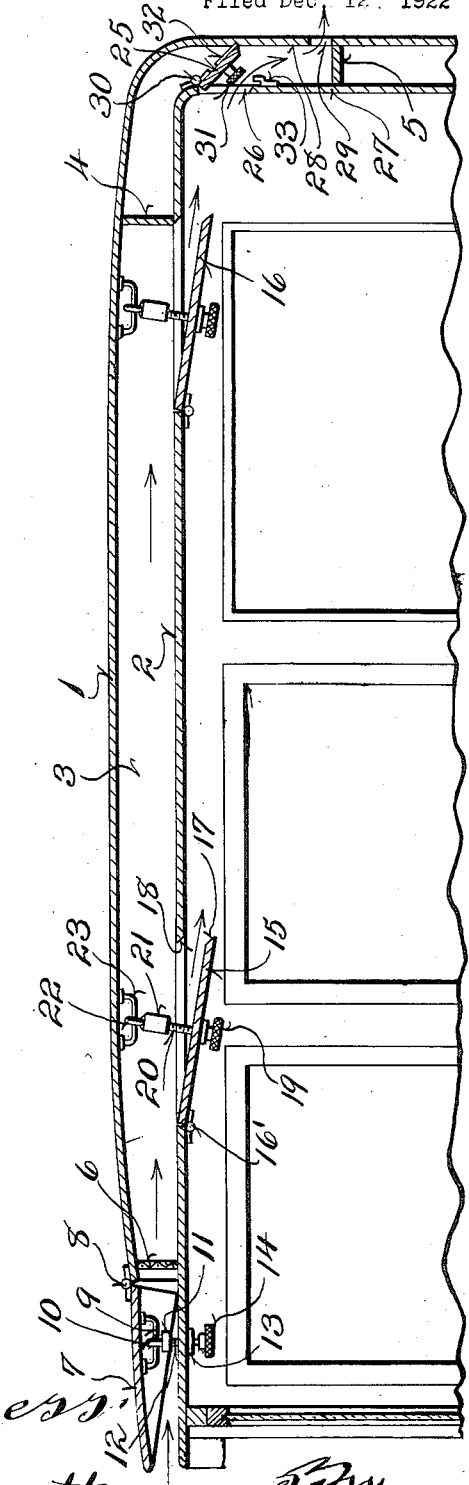
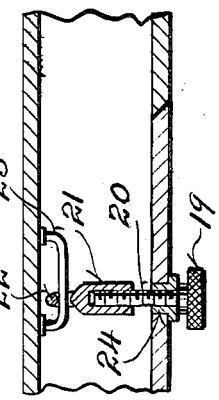
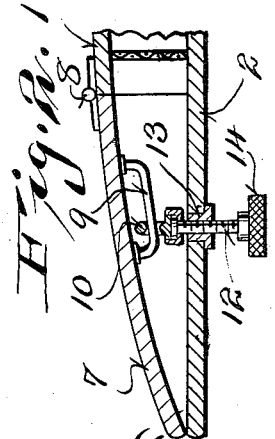
Inventor
Ernest Eggimann Patented Feb. 12, 1924.

1,483,290

UNITED STATES PATENT OFFICE.

ERNEST EGGIMANN, OF MOUNT HOREB, WISCONSIN.

AUTOMOBILE VENTILATOR.

Application filed December 12, 1922. Serial No. 606,404.

*To all whom it may concern:*

Be it known that I, ERNEST EGGIMANN, a citizen of the United States, and resident of Mount Horeb, in the county of Dane and State of Wisconsin, have invented certain new and useful Improvements in Automobile Ventilators; and I do hereby declare that the following is a full, clear, and exact description thereof.

This invention relates to automobile ventilators, and is particularly directed to a ventilating top for automobiles.

Ventilation secured by means of the usual windows in automobiles is not altogether satisfactory, as it is difficult to insure a complete circulation of air within a closed car on the one hand, and also as the dust and rain cannot be guarded against if the windows are open.

It is to overcome these difficulties that the present invention is designed, and objects of this invention are, therefore, to provide a ventilator for automobiles which will insure a perfect circulation of air in a closed car; which will prevent the entrance of dust or dirt; which may be accurately regulated to secure the exact amount of circulation desired, and which will not admit rain and is, therefore, adapted to be used in all kinds of weather.

An embodiment of the invention is shown in the accompanying drawings, in which—

Figure 1 is a longitudinal sectional view thru the upper portion of a closed automobile.

Figure 2 is a detail view of the forward end thereof.

Figure 3 is a detail view showing one of the ventilators in its closed position.

Referring more particularly to the drawings, it will be seen that the automobile partially illustrated in the drawings is of the closed type, and is provided with a top which has spaced upper and lower walls 1 and 2 respectively, to provide an air passage 3 therebetween. The rear end of this air passage is closed by means of a partition 4, and is further subdivided adjacent its vertical rear portion by means of a second partition 5. A screen 6 is provided adjacent the forward end of the passage to prevent entrance of dust and dirt.

The opening at the forward end of the passage is controlled by means of a movable portion 7 pivotally joined to the upper portion by means of a hinge 8, such hinge being preferably so arranged as to be water tight. The means for adjusting the hinged portion 7 of the forward ventilator may comprise a U-shaped bar 9, whose ends are secured to the underside of the portion 7. An eyelet 10 is slidably mounted upon this bar, and is swively joined by means of the enlarged portion 11 to a threaded stem, or screw, 12. This screw projects thru a nut 13, carried by the lower wall 2, and is provided with a knurled adjusting handle 14. It will be seen from reference to Figures 1 and 2, that as the handle, or hand wheel, 14 is rotated, the screw 12 is moved relatively to the nut 13, the eyelet 10 freely sliding upon the U-shaped member 9 to accommodate the relative angularity resulting from the movement of the parts in a well known manner.

Intermediate ventilators are provided which open thru the bottom wall 2 into the interior of the car. One of such ventilators 15 is positioned adjacent the forward end of the car and a second ventilator 16 is positioned adjacent the rear of the car, just forwardly of the partition 4. These ventilators are similar in construction, and one only, for instance the forward one, will be described in detail.

This ventilator 15 is hinged at 16' to the under surface of the bottom wall 2 of the air passage 3, and has a bevelled rear edge 17 adapted to cooperate with the corresponding beveled edge 18 formed on the wall 2. The opening of this ventilator is regulated by means of a hand wheel 19 rigidly secured to an adjusting screw 20. The upper end of this screw is threaded into an elongated nut 21 provided with an upper eyelet 22. The eyelet is mounted upon a U-shaped member 23, similar to the U-shaped member 9 previously described. The screw 20 is threaded thru a nut 24 carried in the movable ventilator portion 15.

A rear ventilator 25 is provided and is adapted to furnish an opening 26 thru the rear inner wall 27 of the automobile. The rear outer wall 28 is provided with an opening 29 thru which the air may pass outwardly from the machine. This ventilator may be regulated in a manner similar to that previously described. It is however shown as pivotally mounted upon a relatively stiff hinge 30, for instance, and provided with a hand wheel 31 adapted to rock an arm 32 and lock such arm in a cooperating latch 33 when the ventilator is closed. It is adapted to be held open frictionally in any desired position.

It is to be understood that the particular means for adjusting the several ventilators may be interchanged, and any ventilator may be provided with any of the adjusting means shown or any similar adjusting means, as desired.

It will be seen that a ventilating top has been provided for a closed automobile, in which the exact needs of the occupants may be filled in a simple and efficacious manner. It will also be seen that a ventilator has been provided which will prevent the entrance of dust and dirt into the machine, and which may be used in any kind of weather.

I claim:

A closed automobile having a double walled top providing an air passage therebetween, a screen mounted transversely of said passage adjacent the front, an adjustable closure for the front end of said passage located in front of said screen, a ventilator providing a variable opening through the lower of the top walls for placing the passage in communication with the interior of said automobile, a partition interposed between said walls rearwardly of said ventilator for closing the passageway between said walls, and an adjustable rear ventilator for allowing air to flow outwardly from the rear of said automobile.

In testimony that I claim the foregoing I have hereunto set my hand at Mount Horeb, in the county of Dane and State of Wisconsin.

ERNEST EGGIMANN.